(12) United States Patent
Nakanishi

(10) Patent No.: US 11,932,190 B2
(45) Date of Patent: Mar. 19, 2024

(54) AIRBAG APPARATUS FOR VEHICLE

(71) Applicant: SUBARU CORPORATION, Tokyo (JP)

(72) Inventor: Shoichiro Nakanishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/877,509

(22) Filed: Jul. 29, 2022

(65) Prior Publication Data

US 2023/0078689 A1    Mar. 16, 2023

(30) Foreign Application Priority Data

Sep. 15, 2021 (JP) .................................. 2021-149838

(51) Int. Cl.
*B60R 21/205* (2011.01)
*B60R 21/233* (2006.01)
*B60R 21/239* (2006.01)

(52) U.S. Cl.
CPC .......... *B60R 21/205* (2013.01); *B60R 21/233* (2013.01); *B60R 21/239* (2013.01); *B60R 2021/23308* (2013.01); *B60R 2021/23324* (2013.01)

(58) Field of Classification Search
CPC ........ B60R 21/205; B60R 2021/23308; B60R 21/231; B60R 21/203; B60R 21/233
See application file for complete search history.

(56) References Cited

U.S. PATENT DOCUMENTS

| | | | | |
|---|---|---|---|---|
| 7,934,747 | B2 * | 5/2011 | Miyata ................ | B60R 21/2338 280/743.1 |
| 8,544,882 | B2 * | 10/2013 | Gulde ................... | B60R 21/231 280/743.1 |
| 9,561,774 | B2 * | 2/2017 | Cheng ................... | B60R 21/239 |
| 9,738,243 | B2 * | 8/2017 | Fukawatase ........ | B60R 21/2338 |
| 10,279,769 | B2 * | 5/2019 | Nakanishi ........... | B60R 21/2338 |
| 10,315,610 | B2 * | 6/2019 | Moritani ............... | B60R 21/233 |
| 10,343,641 | B2 * | 7/2019 | Abramoski .......... | B60R 21/233 |
| 10,427,638 | B2 * | 10/2019 | Choi ..................... | B60R 21/205 |
| 10,821,932 | B2 * | 11/2020 | Kanegae ............... | B60R 21/233 |
| 2016/0311392 | A1 * | 10/2016 | Jindal ................... | B60R 21/206 |

(Continued)

FOREIGN PATENT DOCUMENTS

JP     H03-159838 A    7/1991

*Primary Examiner* — Paul N Dickson
*Assistant Examiner* — Matthew Joseph Ganci
(74) *Attorney, Agent, or Firm* — MCGINN I.P. LAW GROUP, PLLC

(57) ABSTRACT

An airbag apparatus for a vehicle includes an airbag disposed on behind an instrument panel and configured to be expanded and deployed rearward of the vehicle so as to be positioned on a front side of an occupant. The airbag includes a recess in a rear surface of the airbag that are to be opened rearward of the vehicle and positioned on the front side of the occupant's head, an upper expansion to be expanded rearward and on an upper side of the recess and extend in the vehicle lateral direction, left and right side expansions in pairs to be expanded rearward and on opposite sides of the recess in the airbag's width direction, and a lower expansion that is to be expanded rearward and on a lower side of the recess, extend in the vehicle lateral direction, and be positioned on the front side of the occupant's chest.

18 Claims, 5 Drawing Sheets

(56) References Cited

U.S. PATENT DOCUMENTS

2018/0354450 A1* 12/2018 Yamada ................ B60R 21/231
2020/0086821 A1*  3/2020 Nakajima ............. B60R 21/205
2020/0122678 A1*  4/2020 Tanaka ................ B60R 21/0132

* cited by examiner

AIRBAG APPARATUS FOR VEHICLE

CROSS-REFERENCE TO RELATED APPLICATIONS

The present application claims priority from Japanese Patent Application No. 2021-149838 filed on Sep. 15, 2021, the entire contents of which are hereby incorporated by reference.

BACKGROUND

The disclosure relates to an airbag apparatus for a vehicle.

Upon a frontal collision of a vehicle (automobile) with a collision object, the vehicle expands and deploys an airbag in front of an occupant so as to restrain an upper half of the body of the occupant moving forward. Thus, the vehicle provides the performance of protecting the occupant. For example, Japanese Unexamined Patent Application Publication (JP-A) No. H3-159838 discloses an airbag apparatus that detects the build of an occupant from a seat position, an inclination angle of a seat back, an unwinding amount of a seatbelt, and the like, and changes the timing to deploy the airbag in accordance with the build of the occupant. This can improve the performance of protecting the occupant with the airbag.

SUMMARY

An aspect of the disclosure provides an airbag apparatus for a vehicle. The airbag apparatus includes an airbag. The airbag is disposed on a rear side of an instrument panel of the vehicle. The airbag is configured to be expanded and deployed rearward of the vehicle from the instrument panel upon being supplied with gas so as to be positioned on a front side of an occupant of the vehicle in a longitudinal direction of the vehicle. The airbag includes a recess, an upper expansion, a left side expansion and a right side expansion in pairs, and a lower expansion. The recess is formed in a rear surface of the airbag. The recess is configured to be opened rearward of the vehicle and positioned on a front side of a head of the occupant in the longitudinal direction. The upper expansion is configured to be expanded rearward of the vehicle and on an upper side of the recess in a vertical direction of the vehicle. The upper expansion is configured to extend in a lateral direction of the vehicle. The left side expansion and the right side expansion in pairs are configured to be expanded rearward of the vehicle and on respective sides of the recess in a width direction of the airbag. The lower expansion is configured to be expanded rearward of the vehicle and on a lower side of the recess in the vertical direction. The lower expansion is configured to extend in the lateral direction and positioned on a front side of a chest of the occupant in the longitudinal direction.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
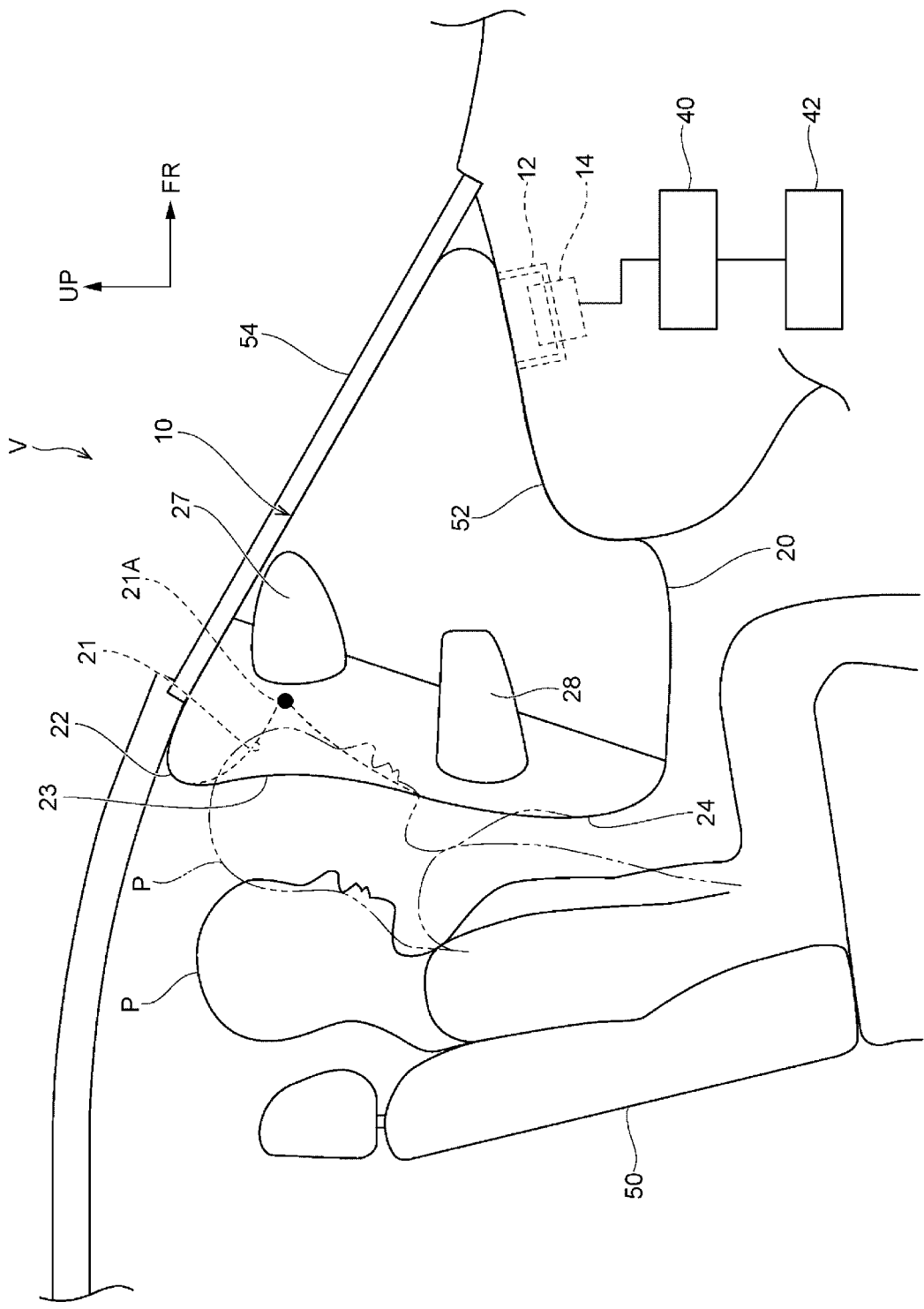
FIG. 1 is a side view of a left side of a front portion of a cabin of a vehicle to which an airbag apparatus according to an embodiment of the disclosure is applied, as viewed from the right, illustrating an airbag in an expanded and deployed state.

Collision modes of a frontal collision of a vehicle include a full-lap frontal collision and an offset frontal collision. In view of improving the performance of protecting an occupant from each of these collision modes, it is desirable to increase the size of an airbag and restrain the occupant during the frontal collision.

However, when the size of the airbag is increased, there is a possibility of the airbag swinging due to the mass of the airbag, for example, while expanding and deploying. Therefore, in the case of the airbag for a front passenger's seat disclosed in JP-A No. 3-159838, positions of the head of the passenger and the airbag may be misaligned from each other so that restraint performance of the air bag for the passenger may be impaired. In this case, the performance of protecting the passenger may be degraded.

It is desirable to provide an airbag apparatus for a vehicle that can improve the performance of protecting an occupant.

Hereinafter, an airbag apparatus 10 according to an embodiment of the disclosure will be described with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. For purposes of illustration in the drawings, arrow FR indicates a vehicle front side of a vehicle (automobile) V to which the airbag apparatus 10 is applied; arrow UP indicates a vehicle upper side; and arrow LH indicates a vehicle left side (one side of a vehicle width direction). In the following description, a vertical direction, a fore-and-aft direction, and a lateral direction are used to respectively indicate a vehicle vertical direction, a vehicle fore-and-aft direction, and a vehicle lateral direction unless otherwise specified.

As illustrated in FIG. 1, the airbag apparatus 10 is configured as a front passenger's seat airbag apparatus for protecting a front-seat passenger P as a passenger seated in a front passenger's seat 50 disposed at the front of a cabin of the vehicle V. It is noted that FIG. 1 illustrates an airbag 20 of the airbag apparatus 10 in an expanded and deployed state.

Figure 4:
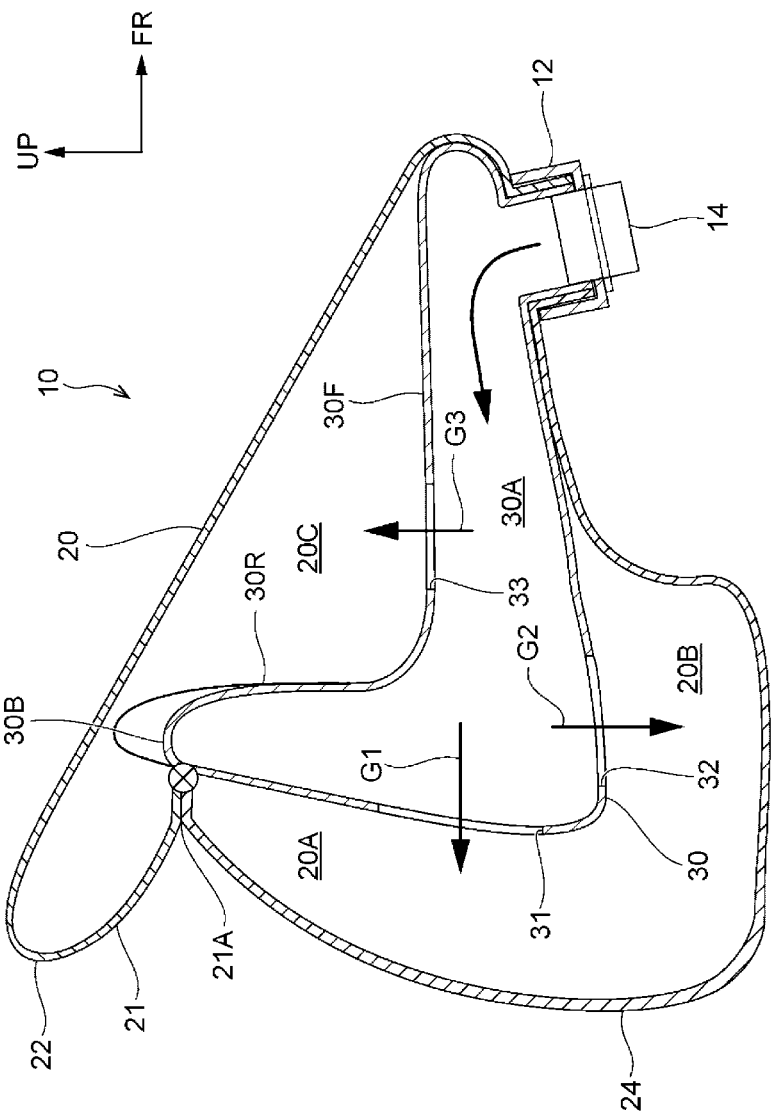
FIG. 4 is a cross-sectional view of the inside of the airbag illustrated in FIG. 2A, as viewed from the right (a cross-sectional view taken along line 4-4 of FIG. 2A).
Figure 5A:
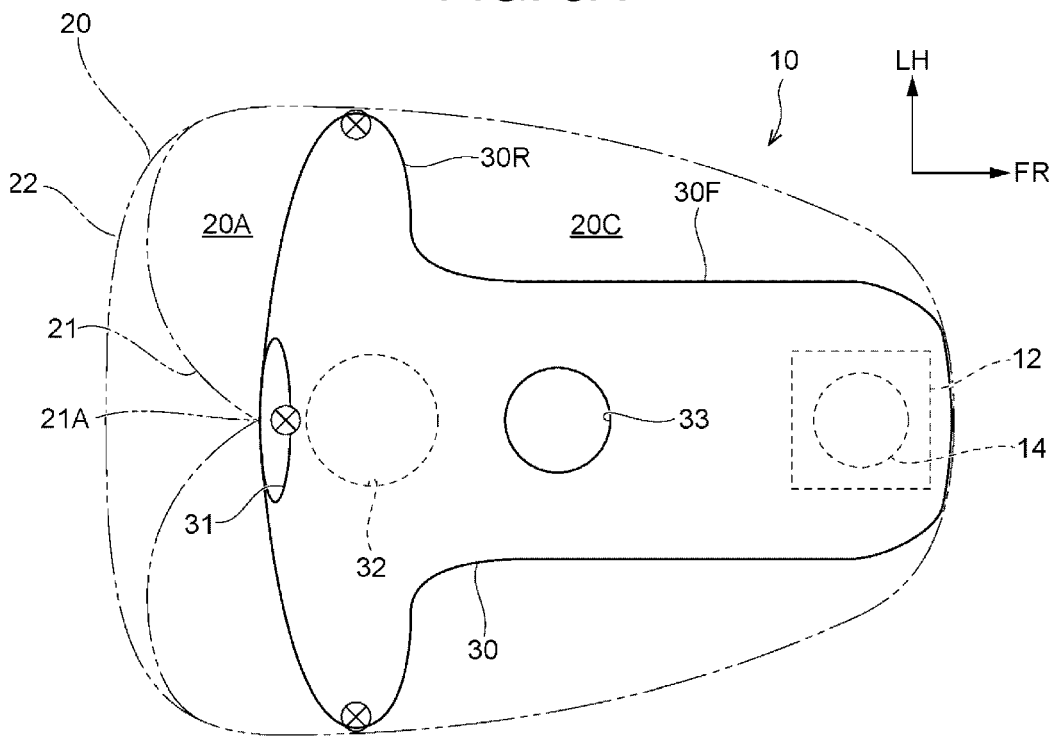
FIG. 5A is a plan view of a flow guide cloth illustrated in FIG. 4, as viewed from above.
Figure 5B:
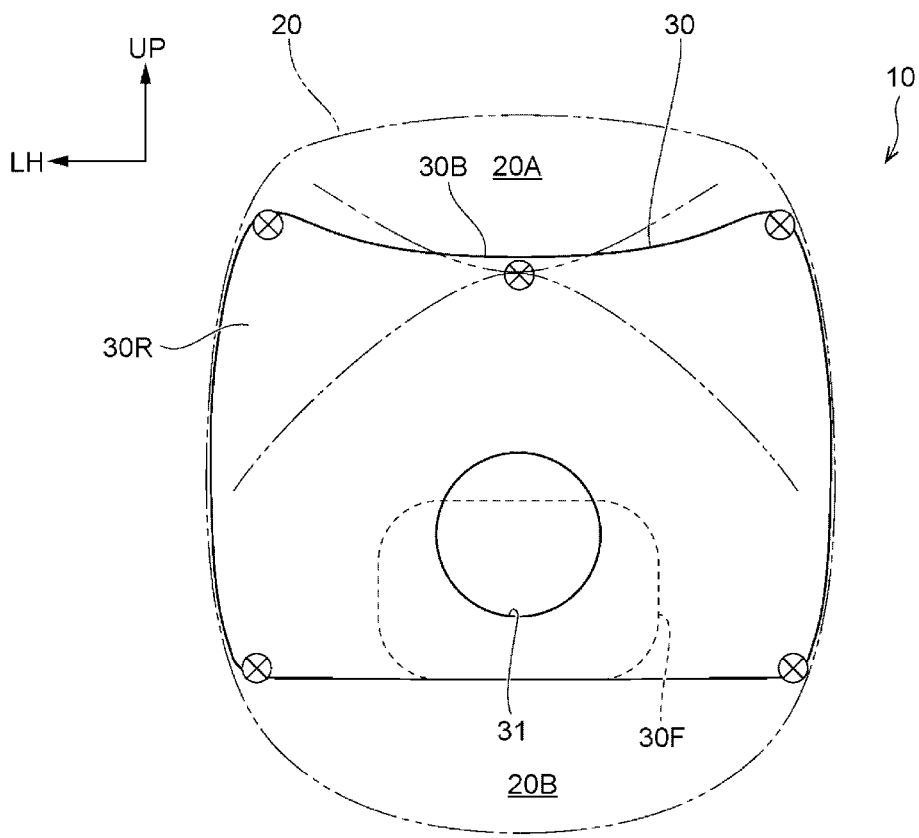
FIG. 5B is a rear view of the flow guide cloth illustrated in FIG. 5A, as viewed from the rear.

The airbag apparatus 10 includes a module case 12, the airbag 20, an inflator 14 (gas generator), and a flow guide cloth 30 (see FIGS. 4, 5A, and 5B). The module case 12 has a substantially rectangular box shape opened upward. The airbag 20 is folded and held within the module case 12. The inflator 14 ejects and supplies gas into the airbag 20. The flow guide cloth 30 is disposed inside the airbag 20 and forms a passage of the gas ejected by the inflator 14.

The airbag apparatus 10 is disposed in (and at a rear side of) an instrument panel 52 in front of the front passenger's seat 50 and supported by an instrument panel reinforce (not illustrated), for example, which is a frame member of the instrument panel 52. An airbag door is formed in a portion of the instrument panel 52 that covers the module case 12. A configuration of the airbag apparatus 10 will be described below.

Airbag 20

Figure 2A:
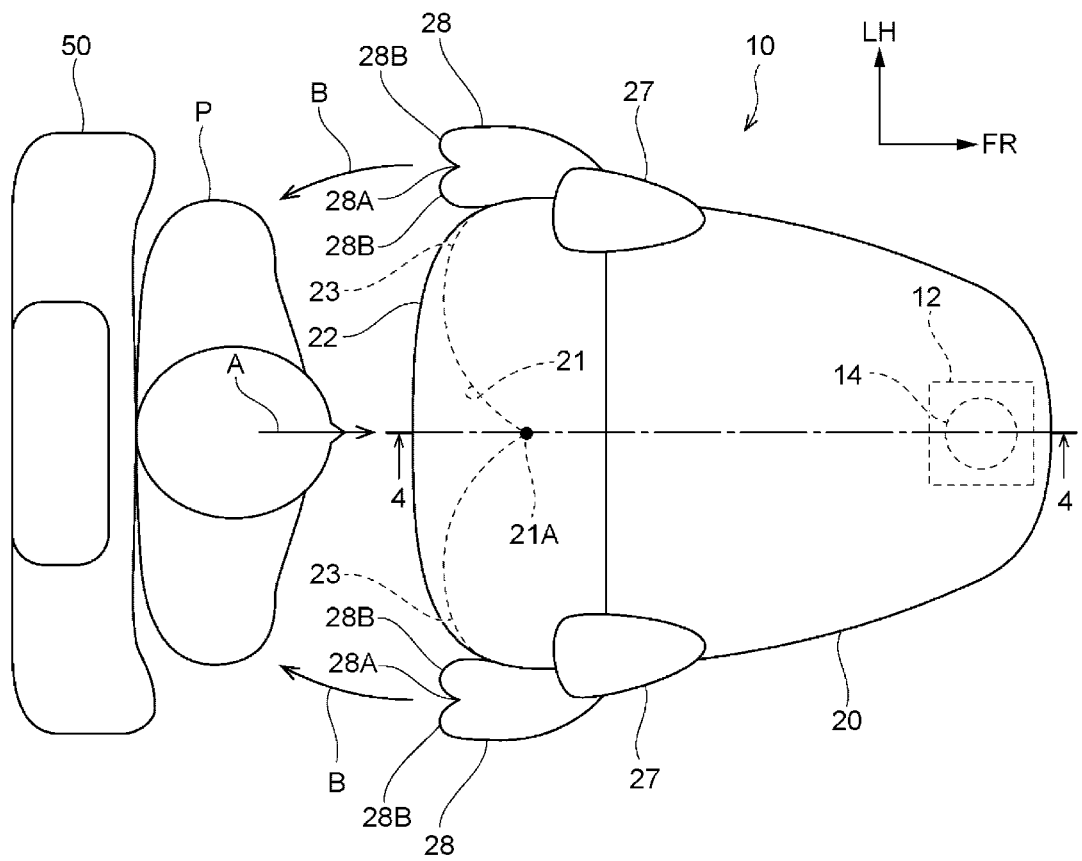
FIG. 2A is a plan view of the airbag apparatus illustrated in FIG. 1, as viewed from above.
Figure 2B:
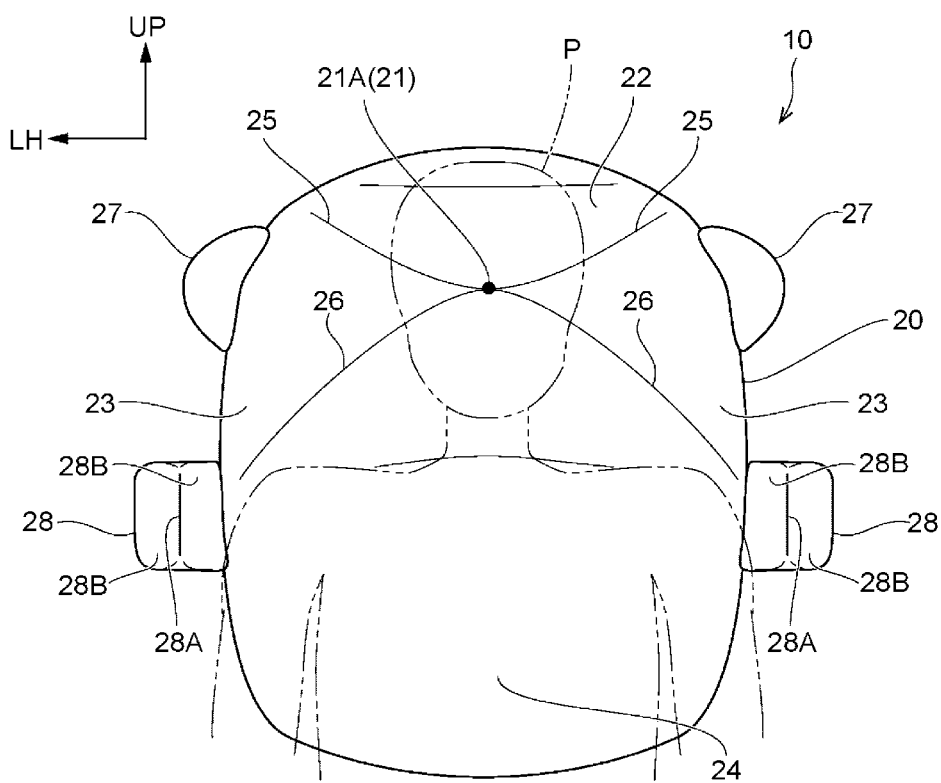
FIG. 2B is a rear view of the airbag apparatus illustrated in FIG. 1, as viewed from the rear.
Figure 3:
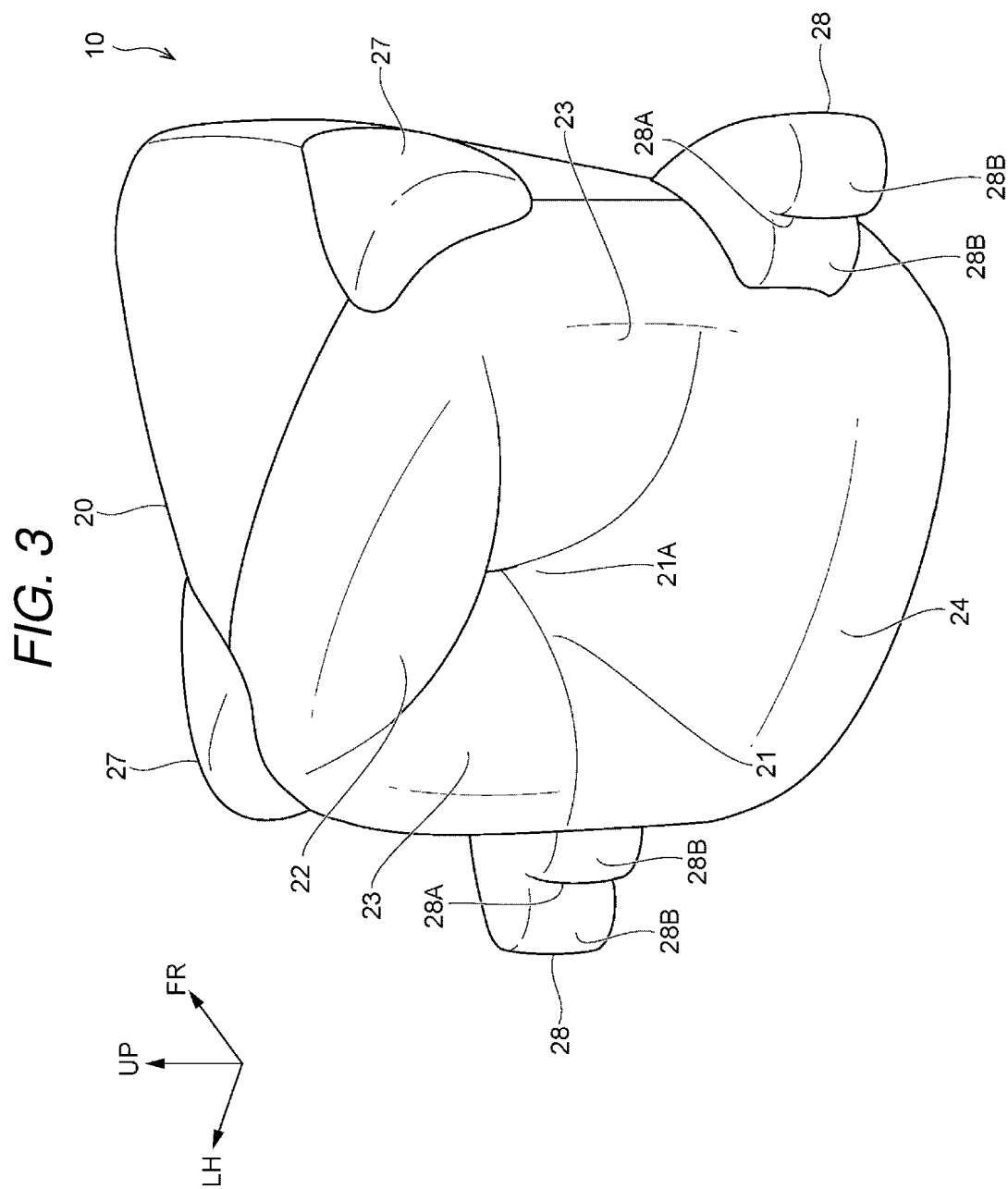
FIG. 3 is a perspective view of the airbag illustrated in FIG. 1, in the expanded and deployed state.

As illustrated in FIGS. 1 to 3, the airbag 20 is formed, for example, in a bag shape by sewing outer peripheral portions of a plurality of base cloths. When supplied with gas from the inflator 14, the airbag 20 is expanded and deployed rearward from the instrument panel 52 and is disposed in front of the front-seat passenger P. In one example, a center portion of the airbag 20 in a width direction (lateral direction) is positioned in front of the front-seat passenger P so that the head and the upper body of the front-seat passenger P that move forward during a frontal collision are restrained by the airbag 20. In a side view, a front portion of the airbag 20 is disposed along the instrument panel 52 and a windshield glass 54 of the vehicle V and in contact with the instrument panel 52 and the windshield glass 54. With this configuration, the airbag 20 is supported from the front by the instrument panel 52 and the windshield glass 54.

A recess 21 is formed in a center portion of a rear surface of the airbag 20 in the width direction and on an upper end side of the rear surface. The recess 21 is opened rearward. The recess 21 is coupled to the flow guide cloth 30, described later, and pulled forward by the flow guide cloth 30. That is, the recess 21 has a substantially quadrangular pyramid shape with a front end 21A of the recess 21 as a vertex, and side surfaces of the recess 21 are curved.

The rear surface of the airbag 20 includes an upper expansion 22 above the recess 21. The upper expansion 22 is expanded in a substantially arcuate shape, which is convex rearward as viewed in the lateral direction. A lower side surface of the upper expansion 22 constitutes an upper side surface of the recess 21. The upper expansion 22 extends in the lateral direction over an entire width of the airbag 20 and has a substantially elliptic shape with longer sides in the lateral direction as viewed from the rear. In one example, a boundary 25 (see FIG. 2B) between a side expansion 23, described later, and the upper expansion 22 extends from the front end 21A of the recess 21 outward in the width direction of the airbag 20 and is inclined upward as viewed from the rear.

The rear surface of the airbag 20 includes a pair of left and right side expansions 23 respectively on opposite sides of the recess 21 in the lateral direction. Each of the side expansions 23 is expanded in a substantially arcuate shape, which is convex rearward as viewed from above. An inner side surface of the side expansion 23 in the lateral direction constitutes the side surface of the recess 21 on each side of the lateral direction. The side expansion 23 is disposed adjacent on the lower side of the upper expansion 22 with the boundary 25 intervening therebetween.

The rear surface of the airbag 20 includes a lower expansion 24 below the recess 21. The lower expansion 24 is expanded in a substantially arcuate shape, which is convex rearward as viewed in the lateral direction. An upper side surface of the lower expansion 24 constitutes a lower side surface of the recess 21. In a similar manner to the upper expansion 22, the lower expansion 24 extends in the lateral direction over the entire width of the airbag 20 and has a substantially pentagonal shape as viewed from the rear. In one example, a boundary 26 (see FIG. 2B) between each of the side expansions 23 and the lower expansion 24 extends from the front end 21A of the recess 21 outward in the width direction and is inclined downward as viewed from the rear.

In this configuration, the recess 21 is a recessed portion that the head of the front-seat passenger P moving forward enters. In one example, the front end 21A of the recess 21 is disposed in front of the head (forehead) of the front-seat passenger P. Such a setting is made that the forehead of the front-seat passenger P inclined forward upon a frontal collision is placed in front of the front end 21A of the recess 21 (see the front-seat passenger P indicated by the double-dot chain line in FIG. 1). Thus, as viewed from the rear, the left and right side surfaces of the recess 21 are disposed outside the head of the front-seat passenger P in the lateral directions. A lower end of the lower side surface of the recess 21 is disposed in front of the jaw of the front-seat passenger P and serves as a jaw restraint to receive the jaw of the front-seat passenger P moving forward (see the front-seat passenger P indicated by the double-dot chain line in FIG. 1). The airbag 20 has such a configuration that while the jaw of the front-seat passenger P moving forward is restrained by the lower side surface of the recess 21, the chest of the front-seat passenger P is received by the lower expansion 24. It is noted that in this embodiment, a human-body dummy of AM50 (50th-percentile American male adult) is used as the front-seat passenger P.

A pair of left and right temporal restraints 27 are disposed respectively on opposite sides of a rear end portion of the airbag 20 in the width direction. As viewed from the rear, the temporal restraints 27 are disposed outside the head of the front-seat passenger P in the lateral directions. In one example, as viewed from the rear, the temporal restraints 27 are disposed outside the side expansions 23 in the lateral directions and protrude outward from the airbag 20 in the lateral directions. As will be described in detail below, during a frontal collision of the vehicle V, the temporal restraints 27 hold portions in the vicinity of the ears (temporal portions) of the head of the front-seat passenger P from outside in the lateral directions so as to restrain the head.

A pair of left and right shoulder restraints 28 are disposed respectively on opposite sides of the rear end portion of the airbag 20 in the width direction. As viewed from the rear, the shoulder restraints 28 are disposed outside the shoulders of the front-seat passenger P in the lateral directions. In one example, as viewed from the rear, the shoulder restraints 28 are disposed outside the lower expansion 24 in the lateral directions and expanded outward from the airbag 20 in the lateral directions. As viewed from the rear, the shoulder restraints 28 are disposed across the boundaries 26. The shoulder restraints 28 are disposed at the rear of the temporal restraints 27, and rear ends of the shoulder restraints 28 are disposed at the rear of the front end 21A of the recess 21. As will be described in detail below, during a frontal collision of the vehicle V, the shoulders of the front-seat passenger P moving forward are restrained by the shoulder restraints 28.

A recessed portion 28A opened rearward is formed in an intermediate portion of the rear end of each of the shoulder restraints 28 in the lateral direction. The recessed portion 28A extends vertically. Thus, a pair of left and right pads 28B are formed on the rear end of the shoulder restraint 28 and expanded rearward. When the shoulders of the front-seat passenger P are restrained by the shoulder restraints 28, each of the shoulders is held between the pair of pads 28B.

Flow Guide Cloth 30

As illustrated in FIGS. 4, 5A, and 5B, in a similar manner to the airbag 20, the flow guide cloth 30 is formed in a bag shape by sewing outer peripheral portions of a plurality of base cloths. The flow guide cloth 30 extends in the fore-and-aft direction inside the airbag 20. The inflator 14 is disposed at a front end of the flow guide cloth 30. The inside of the flow guide cloth 30 serves as a passage 30A to allow the gas ejected by the inflator 14 to flow into the airbag 20.

The flow guide cloth 30 has a substantially hollow horn shape (a hollow trumpet shape) extending in the fore-and-aft direction. In one example, a front portion of the flow guide cloth 30 is formed as a front flow-guide-cloth part 30F of a substantially hollow cylindrical shape extending in the fore-and-aft direction. A rear end portion of the flow guide cloth 30 is formed as a rear flow-guide-cloth part 30R. As viewed from the right, the rear flow-guide-cloth part 30R extends upward from a rear end of the front flow-guide-cloth part 30F of the flow guide cloth 30. As viewed from above, the rear flow-guide-cloth part 30R extends to opposite sides in the lateral directions from the rear end of the front flow-guide-cloth part 30F of the flow guide cloth 30. As viewed from the rear, the rear flow-guide-cloth part 30R has a substantially rectangular shape. A cut-out portion 30B is formed in an upper end of the rear flow-guide-cloth part 30R of the flow guide cloth 30. The cut-out portion 30B is curved in a substantially arcuate shape convex downward as viewed from the rear.

A lower wall of the flow guide cloth 30 is disposed along a lower wall of the front portion of the airbag 20. An outer peripheral portion of the rear flow-guide-cloth part 30R of the flow guide cloth 30 is coupled to an outer peripheral portion of the airbag 20 by sewing, for example. In one example, four outer peripheral corners of the rear flow-guide-cloth part 30R of the flow guide cloth 30 are coupled to the outer peripheral portion of the airbag 20 by sewing, for example (see X marks in FIGS. 5A and 5B).

The rear flow-guide-cloth part 30R of the flow guide cloth 30 is disposed at the front of the rear end portion of the airbag 20 (where the upper expansion 22, the side expansions 23, and the lower expansion 24 are formed). The front end 21A of the recess 21 of the airbag 20 is coupled to a center portion of a rear surface of the rear flow-guide-cloth part 30R of the flow guide cloth 30 in the lateral direction by sewing, for example (see an X mark in FIG. 4). Thus, inside the airbag 20, there are defined a rear space 20A at the rear of the rear flow-guide-cloth part 30R of the flow guide cloth 30, a lower space 20B below the rear flow-guide-cloth part 30R of the flow guide cloth 30, and a front space 20C above the front flow-guide-cloth part 30F of the flow guide cloth 30. The rear space 20A and the lower space 20B communicate with each other below the rear flow-guide-cloth part 30R of the flow guide cloth 30, and the rear space 20A and the front space 20C communicate with each other via the cut-out portion 30B of the rear flow-guide-cloth part 30R of the flow guide cloth 30.

A rear-side main vent hole 31, which is a circular rear outlet, is formed through a substantially center portion of a rear wall of the rear flow-guide-cloth part 30R of the flow guide cloth 30. The rear-side main vent hole 31 is opened rearward and allows the passage 30A of the flow guide cloth 30 and the rear space 20A to communicate with each other. A rear-side lower vent hole 32, which is a circular lower outlet, is formed through a center portion of a lower end of the rear flow-guide-cloth part 30R of the flow guide cloth 30 in the lateral direction. The rear-side lower vent hole 32 is opened rearward and allows the passage 30A of the flow guide cloth 30 and the lower space 20B to communicate with each other. A front vent hole 33, which is a circular front outlet, is formed through an intermediate portion of an upper wall of the front flow-guide-cloth part 30F of the flow guide cloth 30 in the fore-and-aft direction. The front vent hole 33 is opened upward and allows the passage 30A of the flow guide cloth 30 and the front space 20C to communicate with each other. An opening area of the rear-side main vent hole 31 is larger than an opening area of the rear-side lower vent hole 32, and the opening area of the rear-side lower vent hole 32 is larger than an opening area of the front vent hole 33. The rear-side lower vent hole 32 is disposed at a front side of the rear-side main vent hole 31, and the front vent hole 33 is disposed at a front side of the rear-side lower vent hole 32.

Inflator 14

As illustrated in FIG. 4, the inflator 14 is incorporated in a front end of the airbag 20 and the front end of the flow guide cloth 30. The inflator 14 has a hollow, substantially cylindrical shape having a vertical axial direction, and the inflator 14 is secured to a bottom wall of the module case 12. As illustrated in FIG. 1, the inflator 14 is electrically connected to an airbag ECU 40 (control device). When the inflator 14 is operated by the airbag ECU 40, the gas ejected from the top of the inflator 14 is supplied into the passage 30A of the flow guide cloth 30 and discharged into the airbag 20 via the rear-side main vent hole 31, the rear-side lower vent hole 32, and the front vent hole 33 in the flow guide cloth 30 so as to expand and deploy the airbag 20. As the airbag 20 is expanded and deployed, the airbag 20 ruptures the airbag door (in the instrument panel 52) open so that the airbag 20 is expanded and deployed outside (outward of) the instrument panel 52.

A collision sensor 42 is electrically connected to the airbag ECU 40. The airbag ECU 40 detects or predicts a frontal collision of the vehicle V based on information from the collision sensor 42. Upon detection or prediction of the frontal collision, the airbag ECU 40 operates the inflator 14.

Functions and Effects

Next, functions and effects of the embodiment will be described.

In the airbag apparatus 10 of the above-described configuration, when the airbag ECU 40 detects or predicts a frontal collision of the vehicle V based on a signal from the collision sensor 42, the airbag ECU 40 operates the inflator 14. Thus, the gas ejected from the inflator 14 is supplied into the airbag 20 via the passage 30A of the flow guide cloth 30, and the airbag 20 supplied with the gas ruptures the airbag door in the instrument panel 52 open so that the airbag 20 is expanded and deployed rearward from the instrument panel 52. In one example, the gas in the passage 30A of the flow guide cloth 30 is discharged into the rear space 20A of the airbag 20 via the rear-side main vent hole 31 (see arrow G1 in FIG. 4), discharged into the lower space 20B of the airbag 20 via the rear-side lower vent hole 32 (see arrow G2 in FIG. 4), and discharged into the front space 20C of the airbag 20 via the front vent hole 33 (see arrow G3 in FIG. 4) so as to expand and deploy the airbag 20. Thus, the airbag 20 is expanded and deployed in front of the front-seat passenger P.

During the frontal collision of the vehicle V, inertial force makes the front-seat passenger P move forward (in a direction indicated by arrow A in FIG. 2A). In one example, because the front-seat passenger P is wearing a seatbelt, not illustrated, the upper body of the front-seat passenger P is inclined forward pivotally about the waist of the front-seat passenger P. When the upper body of the front-seat passenger P is inclined forward, the head of the front-seat passenger P is guided by the upper side surface and the left and right side surfaces of the recess 21 (namely, the upper expansion 22 and the pair of side expansions 23) and enters the recess 21. At this time, the jaw of the front-seat passenger P moving forward comes into contact with the lower side surface of the recess 21 and is restrained by the lower side surface.

When the upper body of the front-seat passenger P is further inclined forward, the chest of the front-seat passenger P comes into contact with a center portion of the lower expansion 24 of the airbag 20 in the lateral direction and presses the center portion of the lower expansion 24 in the lateral direction forward. Thus, the rear end portion of the airbag 20 starts to be bent by the upper half body of the front-seat passenger P and is deformed. In one example, the airbag 20 is deformed in such a manner that opposite sides of the rear end portion of the airbag 20 in the width direction are displaced inward in the width direction (in direction indicated by arrows B in FIG. 2A).

When the opposite sides of the rear end portion of the airbag 20 in the width direction are displaced inward in the width direction, the left and right shoulder restraints 28 of the airbag 20 come into contact with the shoulders of the front-seat passenger P so that the upper half body of the front-seat passenger P is supported by the shoulder restraints 28 from the front. Thus, the upper body of the front-seat passenger P moving forward is restrained by the lower expansion 24 and the shoulder restraints 28. At this time, because the head of the front-seat passenger P is buried in the airbag 20 more deeply than the chest of the front-seat passenger P is, the left and right temporal restraints 27 of the airbag 20 are displaced to hold the temporal portions of the passenger from opposite sides in the width direction. Thus, the head of the front-seat passenger P moving forward is restrained by the pair of temporal restraints 27. With the above-described configuration, during the frontal collision of the vehicle V, the head and the upper body of the front-seat passenger P moving forward can be restrained by the airbag 20.

A frontal collision of the vehicle V has collision modes such as a full-lap frontal collision and an offset frontal collision. Therefore, in order to improve the performance of protecting the front-seat passenger P from each kind of these collision modes, it is desirable, for example, to increase the size of the airbag 20 so as to restrain the front-seat passenger P. In this case, in accordance with an increase in size of the airbag 20, the airbag 20 being expanded and deployed may swing, for example, in such a manner that a position of the front-seat passenger P moving forward and a position of the airbag 20 may be misaligned from each other.

The rear surface of the airbag 20 includes the recess 21 opened rearward. The airbag 20 also includes the upper expansion 22 expanded rearward on an upper side of the recess 21, the pair of left and right side expansions 23 expanded rearward respectively on opposite sides of the recess 21 in the width direction, and the lower expansion 24 expanded rearward on a lower side of the recess 21. The recess 21 is disposed in front of the head (forehead) of the front-seat passenger P. Consequently, even when the position of the airbag 20 being expanded and deployed is misaligned from the front-seat passenger P, the head of the front-seat passenger P inclined forward during the frontal collision can be guided by the upper side surface and the left and right side surfaces of the recess 21 (namely, the upper expansion 22 and the pair of side expansions 23) and made to enter the recess 21. Thus, while misalignment of the airbag 20 from the front-seat passenger P is compensated for by the recess 21 (the upper expansion 22 and the pair of left and right side expansions 23), the head of the front-seat passenger P can be restrained.

For example, during an offset frontal collision of the vehicle V, when the upper body of the front-seat passenger P is inclined forward to a collision side due to inertial force, the positions of the airbag 20 and the front-seat passenger P may be misaligned. Even in this case, the head of the front-seat passenger P can be guided by the pair of left and right side expansions 23 and made to enter the recess 21. This configuration can improve the performance of protecting the front-seat passenger P.

Moreover, as described above, because the head of the front-seat passenger P inclined forward during the frontal collision is guided by the upper expansion 22 and the pair of left and right side expansions 23 and enters the recess 21, the face and the forehead of the front-seat passenger P that are inclined forward during the frontal collision can be prevented from directly colliding with the rear surface of the airbag 20 from the rear, and at the same time, the head of the front-seat passenger P can be softly restrained from above and from opposite sides of the lateral direction. Therefore, a head injury value of the front-seat passenger P can be prevented from worsening. Furthermore, while the jaw of the front-seat passenger P entering the recess 21 is restrained by the lower side surface of the recess 21, the chest of the front-seat passenger P can be received by the lower expansion 24. Therefore, a chest injury value of the front-seat passenger P can be prevented from worsening.

The pair of left and right shoulder restraints 28 are respectively disposed on opposite sides of the airbag 20 in the width direction and protrude outward in the lateral directions. As viewed from the rear, the shoulder restraints 28 are disposed on opposite sides of the shoulders of the front-seat passenger P in the width direction, and the rear ends of the shoulder restraints 28 are disposed at the rear of the front end 21A of the recess 21. In one example, positions of the rear ends of the shoulder restraints 28 in the fore-and-aft direction are substantially aligned with positions of rear ends of the side expansions 23 in the fore-and-aft direction. Thus, as described above, the upper half body of the front-seat passenger P presses the rear end portion of the airbag 20 forward, and when the rear end portion of the airbag 20 starts to be bent by the upper body of the front-seat passenger P and is deformed, the left and right shoulder restraints 28 of the airbag 20 come into contact with the shoulders of the front-seat passenger P so that the upper half body of the front-seat passenger P can be supported by the shoulder restraints 28 from the front. Therefore, the injury value to the chest of the front-seat passenger P during the collision can be further decreased.

The recessed portion 28A is formed in the intermediate portion of the rear end of each of the shoulder restraints 28 in the lateral direction. The recessed portion 28A has a recessed shape opened rearward and extends vertically. Consequently, the pair of left and right pads 28B are formed on the rear end of the shoulder restraint 28 and expanded rearward. Thus, when the shoulders of the front-seat passenger P are restrained by the shoulder restraints 28, each of the shoulders of the front-seat passenger P can be held by the pair of left and right pads 28B from opposite sides of the lateral direction. This can enhance restraint performance for the shoulders of the front-seat passenger P and can consequently enhance restraint performance for the upper body of the front-seat passenger P.

The pair of left and right temporal restraints 27 are respectively disposed on opposite sides of the airbag 20 in the width direction and protrude outward in the width direction. As viewed from the rear, the temporal restraints 27 are disposed on opposite sides of the head of the front-seat passenger P in the width direction. Thus, as described above, the upper half body of the front-seat passenger P presses the rear end portion of the airbag 20 forward, and when the rear end portion of the airbag 20 starts to be bent by the upper body of the front-seat passenger P and is deformed, the temporal portions of the front-seat passenger P can be held between and restrained by the pair of the temporal restraints 27 from opposite sides of the lateral direction. Therefore, the performance of protecting the head of the front-seat passenger P can be further enhanced.

The temporal restraints 27 are disposed on a front side of the shoulder restraints 28. That is, the shoulder restraints 28 are closer to the front-seat passenger P than the temporal restraints 27 are to the front-seat passenger P. Thus, when the front-seat passenger P moving forward collides with the rear end portion of the airbag 20, the shoulder restraints 28 come into contact with the shoulders of the front-seat passenger P at an early stage, and while the jaw and the shoulders of the front-seat passenger P are supported by the airbag 20 from the front, the temporal portions of the front-seat passenger P can be softly held and restrained from outer sides in the lateral directions. Therefore, the performance of protecting the front-seat passenger P can be effectively improved.

The flow guide cloth 30 is disposed inside the airbag 20, and the inside of the flow guide cloth 30 constitutes the passage 30A to allow the gas ejected by the inflator 14 to flow into the airbag 20. The rear-side main vent hole 31, which is formed through the rear flow-guide-cloth part 30R of the flow guide cloth 30, allows the rear space 20A of the airbag 20 and the passage 30A of the flow guide cloth 30 to communicate with each other. The rear-side lower vent hole 32, which is formed through the rear flow-guide-cloth part 30R, allows the lower space 20B of the airbag 20 and the passage 30A of the flow guide cloth 30 to communicate with each other. The front vent hole 33, which is formed through the front flow-guide-cloth part 30F of the flow guide cloth 30, allows the front space 20C of the airbag 20 and the passage 30A of the flow guide cloth 30 to communicate with each other. With this configuration, the gas discharged via the rear-side main vent hole 31 and the rear-side lower vent hole 32, and the gas discharged via the front vent hole 33 expand and deploy the airbag 20.

In this configuration, the opening area of the rear-side main vent hole 31 is larger than the opening area of the rear-side lower vent hole 32, and the opening area of the rear-side lower vent hole 32 is larger than the opening area of the front vent hole 33. Consequently, a gas supply amount from the flow guide cloth 30 to the rear space 20A is larger than a gas supply amount from the flow guide cloth 30 to the lower space 20B, and the gas supply amount from the flow guide cloth 30 to the lower space 20B is larger than a gas supply amount from the flow guide cloth 30 to the front space 20C. That is, when the airbag 20 is expanded and deployed, the rear end portion of the airbag 20 to mainly receive the head and the upper body of the front-seat passenger P can be expanded and deployed earlier than the front portion of the airbag 20. Therefore, even when the size of the airbag 20 is increased to improve the performance of protecting the front-seat passenger P in accordance with each kind of collision modes at the time of a frontal collision, the head and the upper body of the front-seat passenger P can be restrained by the airbag 20 by expanding and deploying the rear end portion of the airbag 20 at an early stage. In other words, while the restraint performance of the airbag 20 for the front-seat passenger P is maintained, the airbag 20 can be increased in size. The above-described configuration can improve the performance of protecting the front-seat passenger P during the frontal collision.

In particular, the rear end portion of the airbag 20 includes the upper expansion 22 to retrain the head of the front-seat passenger P from above, the side expansions 23 to restrain the head of the front-seat passenger P from opposite sides of the lateral direction, and the lower expansion 24 to receive the jaw of the front-seat passenger P and restrain the chest of the front-seat passenger P. As described above, the opening area of the rear-side main vent hole 31 is larger than the opening area of the rear-side lower vent hole 32. Consequently, the upper expansion 22, the side expansions 23, and the lower expansion 24 can be expanded and deployed toward the front-seat passenger P at an early stage, and then, a lower portion of the lower expansion 24 can be expanded and deployed. Thus, the restraint performance for the front-seat passenger P can be effectively improved.

The cut-out portion 30B is formed in the upper end of the rear flow-guide-cloth part 30R of the flow guide cloth 30. The cut-out portion 30B is curved in a substantially arcuate shape convex downward as viewed from the rear. Via the cut-out portion 30B, the rear space 20A and the front space 20C in the airbag 20 communicate with each other. With this configuration, after the gas is filled into the rear space 20A via the rear-side main vent hole 31, the gas that has been supplied to the rear space 20A via the rear-side main vent hole 31 is allowed to flow to the front space 20C via the cut-out portion 30B. Thus, expansion and deployment of the whole airbag 20 can be stabilized.

It is noted that although the three vent holes are formed in the flow guide cloth 30 in this embodiment, the rear-side lower vent hole 32 may be omitted from the flow guide cloth 30 considering, for example, the size of the airbag 20. Even in this case, the head and the upper body of the front-seat passenger P can be restrained by the airbag 20 by expanding and deploying the rear end portion of the airbag 20 at an early stage.

Although the flow guide cloth 30 is disposed inside the airbag 20 in this embodiment, the flow guide cloth 30 may be omitted from the airbag 20. In such a case, for example, a tether may be provided for the airbag 20 so as to form the recess 21 by pulling the front end 21A of the recess 21 forward using the tether.

The invention claimed is:

1. An airbag apparatus for a vehicle, the airbag apparatus comprising:
   an airbag disposed on a rear side of an instrument panel of the vehicle, the airbag being configured to be expanded and deployed rearward of the vehicle from the instrument panel upon being supplied with gas so as to be positioned on a front side of an occupant of the vehicle in a longitudinal direction of the vehicle,
   the airbag comprising:
      a recess formed in a rear surface of the airbag, the recess being configured to be opened rearward of the vehicle and positioned on a front side of a head of the occupant in the longitudinal direction;

an upper expansion configured to be above the recess, expanded rearward of the vehicle and on an upper side surface of the recess in a vertical direction of the vehicle, the upper expansion being configured to extend in a lateral direction of the vehicle over a width of the airbag and protrude rearward of the vehicle from the recess;

a left side expansion and a right side expansion in pairs configured to be expanded rearward of the vehicle and on respective sides of the recess in a width direction of the airbag; and a lower expansion being configured to be below the recess and expanded rearward of the vehicle and on a lower side surface of the recess in the vertical direction, the lower expansion being configured to extend and protrude rearward of the vehicle from the recess in the lateral direction over the width of the airbag and positioned on a front side of a chest of the occupant in the longitudinal direction, wherein each of the upper expansion, the left side expansion, the right side expansion, and the lower expansion are configured to curve toward each other to form a vertex of the recess and guide the head of the occupant toward the recess.

2. The airbag apparatus according to claim 1, further comprising a left shoulder restraint and a right shoulder restraint in pairs disposed on respective sides of the airbag in the width direction, the left shoulder restraint and the right shoulder restraint protruding outward in the width direction, and wherein the left shoulder restraint and the right shoulder restraint are configured to be positioned on respective shoulders of the occupant in the width direction of the airbag as viewed from a vehicle rear side of the vehicle in the longitudinal direction, and respective rear ends of the left shoulder restraint and the right shoulder restraint are positioned to be disposed on the rear side of a front end of the recess in the longitudinal direction.

3. The airbag apparatus according to claim 2, wherein the respective rear ends of the left shoulder restraint and the right shoulder restraint each comprise a left pad and a right pad in pairs, the left pad and the right pad being configured to be expanded rearward of the vehicle.

4. The airbag apparatus according to claim 2, wherein a left temporal restraint and a right temporal restraint in pairs are disposed on respective sides of the airbag in the width direction, the left temporal restraint and the right temporal restraint being configured to protrude outward in the width direction, and the left temporal restraint and the right temporal restraint are configured to be positioned on respective sides of the head of the occupant in the width direction of the airbag as viewed from the vehicle rear side.

5. The airbag apparatus according to claim 3, wherein a left temporal restraint and a right temporal restraint in pairs are disposed on respective sides of the airbag in the width direction, the left temporal restraint and the right temporal restraint being configured to protrude outward in the width direction, and the left temporal restraint and the right temporal restraint are configured to be positioned on respective sides of the head of the occupant in the width direction of the airbag as viewed from the vehicle rear side.

6. The airbag apparatus according to claim 4, wherein the left temporal restraint and the right temporal restraint are configured to be positioned respectively on front sides of the left shoulder restraint and the right shoulder restraint in the longitudinal direction.

7. The airbag apparatus according to claim 5, wherein the left temporal restraint and the right temporal restraint are configured to be positioned respectively on front sides of the left shoulder restraint and the right shoulder restraint in the longitudinal direction.

8. The airbag apparatus according to claim 1, wherein the recess has a substantially quadrangular pyramid shape with a front end of the recess as a vertex, and side surfaces of the recess are curved.

9. The airbag apparatus according to claim 1, wherein each of the left and the right side expansions is expanded in a substantially arcuate shape, which is convex rearward as viewed from above.

10. The airbag apparatus according to claim 1, wherein an inner side surface of the left side expansion and the right side expansion in a lateral direction comprises a side surface of the recess on each side of the lateral direction.

11. The airbag apparatus according to claim 1, wherein the left side expansion and the right side expansion are disposed adjacent on a lower side of the upper expansion with a boundary intervening therebetween.

12. The airbag apparatus according to claim 1, wherein the lower expansion is expanded in a substantially arcuate shape, which is convex rearward as viewed in the lateral direction.

13. The airbag apparatus according to claim 1, wherein an upper side surface of the lower expansion comprises a lower side surface of the recess.

14. The airbag apparatus according to claim 1, wherein the lower expansion extends in a lateral direction over an entire width of the airbag and has a substantially pentagonal shape as viewed from the rear.

15. The airbag apparatus according to claim 1, wherein the airbag is configured such that the upper expansion, the side expansions, and the lower expansion are expanded and deployed toward the occupant at an earlier stage than a lower portion of the lower expansion is expanded and deployed.

16. A vehicle comprising the airbag apparatus according to claim 1.

17. An airbag apparatus for a vehicle, the airbag apparatus comprising:

an airbag disposed on a rear side of an instrument panel of the vehicle, the airbag being configured to be expanded and deployed rearward of the vehicle from the instrument panel upon being supplied with gas so as to be positioned on a front side of an occupant of the vehicle in a longitudinal direction of the vehicle, the airbag comprising:

a recess formed in a rear surface of the airbag, the recess being configured to be opened rearward of the vehicle and positioned on a front side of a head of the occupant in the longitudinal direction;

an upper expansion configured to be above the recess, expanded rearward of the vehicle and on an upper side surface of the recess in a vertical direction of the vehicle, the upper expansion being configured to extend in a lateral direction of the vehicle over a width of the airbag;

a left side expansion and a right side expansion in pairs configured to be expanded rearward of the vehicle and on respective sides of the recess in a width direction of the airbag; and a lower expansion being configured to be below the recess, expanded rearward of the vehicle and on a lower side surface of the recess in the vertical direction, the lower expansion being configured to extend and protrude in the lateral direction over the width of the airbag and positioned on a front side of a chest of the occupant in the longitudinal direction, wherein each of the upper expansion, the left side expansion, the right side expansion, and the lower expansion are configured to form curved walls toward each other at a rear portion of the airbag with a vertex at the recess.

18. The airbag apparatus according to claim 17, further comprising a left shoulder restraint and a right shoulder restraint in pairs disposed on respective sides of the airbag in the width direction, the left shoulder restraint and the right shoulder restraint protruding outward in the width direction, wherein the left shoulder restraint and the right shoulder restraint are configured to be positioned on respective shoulders of the occupant in the width direction of the airbag as viewed from a vehicle rear side of the vehicle in the longitudinal direction, and respective rear ends of the left shoulder restraint and the right shoulder restraint are positioned to be disposed on the rear side of a front end of the recess in the longitudinal direction, wherein the respective rear ends of the left shoulder restraint and the right shoulder restraint each comprise a left pad and a right pad in pairs, the left pad and the right pad being configured to be expanded rearward of the vehicle, wherein a left temporal restraint and a right temporal restraint in pairs are disposed on respective sides of the airbag in the width direction, the left temporal restraint and the right temporal restraint being configured to protrude outward in the width direction, and wherein the left temporal restraint and the right temporal restraint are configured to be positioned on respective sides of the head of the occupant in the width direction of the airbag as viewed from the vehicle rear side.

* * * * *